United States Patent [19]
Kolomeitsev

[11] Patent Number: 5,719,456
[45] Date of Patent: Feb. 17, 1998

[54] VARIABLE RELUCTANCE ELECTRIC MOTOR

[75] Inventor: Serguei F. Kolomeitsev, Sylvania, Ohio

[73] Assignee: Dana Corporation, Toledo, Ohio

[21] Appl. No.: 245,686

[22] Filed: May 18, 1994

[51] Int. Cl.⁶ .................. H02K 1/06; H02K 1/08
[52] U.S. Cl. .............. 310/112; 310/168; 310/254; 310/261; 310/269; 310/51
[58] Field of Search .................... 310/126, 254, 310/114, 51, 166, 168, 187, 191, 193, 49 R, 269, 266, 112, 209

[56] References Cited

U.S. PATENT DOCUMENTS

| | | | |
|---|---|---|---|
| 1,226,091 | 5/1917 | McCollum | 310/112 |
| 4,025,960 | 5/1977 | Gray et al. | |
| 4,096,624 | 6/1978 | Gray et al. | |
| 4,134,054 | 1/1979 | Akamatsu | 318/685 |
| 4,583,015 | 4/1986 | Toshimatsu | 310/87 |
| 4,626,719 | 12/1986 | Foster | 310/49 R |
| 4,647,802 | 3/1987 | Konecny | 310/49 R |
| 4,843,270 | 6/1989 | Dijken | |
| 4,882,515 | 11/1989 | Radomski | |
| 5,010,266 | 4/1991 | Uchida | |
| 5,111,096 | 5/1992 | Horst | |
| 5,117,144 | 5/1992 | Torok | |
| 5,146,127 | 9/1992 | Smith | |
| 5,148,090 | 9/1992 | Okii et al. | |
| 5,168,190 | 12/1992 | Bahn | |
| 5,444,368 | 8/1995 | Horber | 324/207.16 |
| 5,481,147 | 1/1996 | Kaplan et al. | 310/154 |

Primary Examiner—Steven L. Stephan
Assistant Examiner—Karl Eizo Tamai
Attorney, Agent, or Firm—MacMillan, Sobanski & Todd

[57] ABSTRACT

A variable reluctance electric motor includes a stator having a plurality of radially inwardly extending poles which are divided into a plurality of longitudinal sections. The cross sectional shapes of the first stator pole sections are different from the cross sectional shapes of the second stator pole sections. A rotor is supported within the stator for relative rotational movement and includes a plurality of radially outwardly extending poles which are divided into a plurality of longitudinal sections. The cross sectional shapes of the first rotor pole sections are different from the cross sectional shapes of the second rotor pole sections. The first rotor poles are longitudinally aligned with the first stator poles so as to interact therewith when electrical current is supplied to windings provided on the stator poles. Similarly, the second rotor poles are longitudinally aligned with the second stator poles so as to interact therewith when electrical current is supplied to windings provided on the stator poles. The magnitude of the total torque generated by the motor as a whole is equal to the sum of the magnitudes of the individual torques generated by (1) the interaction of the first rotor poles with the first stator poles and (2) the interaction of the second rotor poles with the second stator poles.

14 Claims, 3 Drawing Sheets

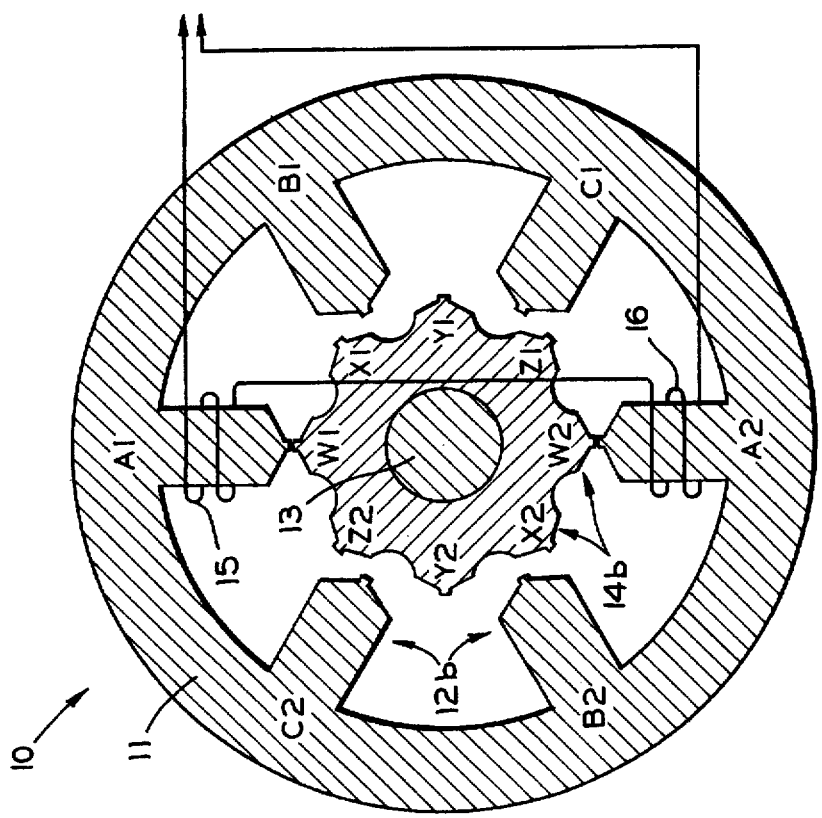

VARIABLE RELUCTANCE ELECTRIC MOTOR

BACKGROUND OF THE INVENTION

This invention relates in general to electric motors and in particular to an improved structure for a variable reluctance electric motor, such as a servo motor.

Electric motors are well known devices which convert electrical energy to rotary mechanical energy. To accomplish this, electric motors establish and control electromagnetic fields so as to cause the desired rotary mechanical motion. There are many different types of electric motors, each utilizing different means for establishing and controlling these electromagnetic fields. Consequently, the operating characteristics of electric motors vary from type to type, and certain types of electric motors are better suited for performing certain tasks than others.

Synchronous motors constitute one principal class of electric motors. The two basic components of a synchronous motor are (1) a stationary member which generates a rotating electromagnetic field, generally referred to as the stator, and (2) a rotatable member driven by the rotating magnetic field, generally referred to as the rotor. Synchronous motors are characterized in that the rotational speed of the rotor is directly related to the frequency of the electrical input signal applied thereto and, therefore, the rotational speed of the electromagnetic field generated thereby. Thus, so long as the frequency of the applied electrical input signal is constant, the rotor will be driven at a constant rotational speed. Within this broad definition, however, the structure and operation of synchronous electric motors vary widely.

One variety of synchronous electric motor is a variable reluctance motor. Variable reluctance motors operate on the principle that a magnetic field which is created about a component formed from a magnetically permeable material will exert a mechanical force on that component. This mechanical force will urge the component to become aligned with the magnetic flux (lines of force) generated by the magnetic field. Thus, by using the stator to establish and rotate a magnetic field about a rotor formed from a magnetically permeable material, the rotor can be driven to rotate relative to the stator. The resistance to the passage of this magnetic flux from the stator to the rotor is referred to as reluctance. The magnitude of this reluctance changes with the rotational position of the rotor relative to the stator. Thus, electric motors of this type are commonly referred to as variable reluctance motors.

In a basic variable reluctance motor structure, this operation can be accomplished by providing a generally hollow cylindrical stator having a plurality of radially inwardly extending poles formed thereon. A winding of an electrically conductive wire is provided about each of the stator poles. Concentrically within the stator, a cylindrical rotor is rotatably supported. The rotor is provided with a plurality of radially outwardly extending poles. However, no electrical conductor windings are provided on the rotor poles. By passing pulses of electrical current through each of the stator windings in a sequential manner, the stator poles can be selectively magnetized so as to attract the rotor poles thereto. Consequently, the rotor will rotate relative to the stator.

Ideally, the magnitude of the output torque generated by the variable reluctance electric motor should be constant throughout the entire extent of each revolution of the rotor relative to the stator. However, as with the magnitude of the reluctance in the variable reluctance electric motor described above, it has been found that the actual magnitude of the output torque generated varies with the rotational position of the rotor relative to the stator. This is because the magnitude of the mechanical force generated by the interaction of any given rotor pole with an associated stator pole will vary as the rotor pole rotates relative to the stator pole. Specifically, as the rotor pole rotates toward the associated stator pole, the magnitude of the torque therebetween initially increases relatively rapidly from near zero to a maximum value. Subsequently, when the rotor pole approaches alignment with the associated stator pole, however, the magnitude of the torque therebetween decreases relatively rapidly from the maximum value to near zero.

Several structures are known in the art to address this varying output torque characteristic of variable reluctance electric motors. In some electric motors, the magnitude of the electric current which is passed through each of the stator windings is varied as the rotor rotates relative to the stator. By selectively increasing and decreasing this energizing electric current, the output torque can be controlled so as to be relatively constant throughout the entire extent of each revolution of the rotor relative to the stator. Unfortunately, to accomplish this, additional electronic circuitry is required to sense the position the rotor relative to the stator and to control the magnitude of the electric current in response thereto. This additional circuitry increases the cost and complexity of the variable reluctance electric motor.

In other electric motors, the stator poles and the rotor poles are formed having cross sectional shapes which minimize the variance of the output torque as a function of rotor position relative to the stator. However, it has been found that such atypically shaped poles are difficult to form in relatively large production quantities. Even then, the output torque from an electric motor having such atypically shaped poles still only approximates the desired constant output torque. Thus, it would be desirable to provide an improved structure for a variable reluctance electric motor which generates a relatively constant output torque and which is simple and inexpensive in construction and operation.

SUMMARY OF THE INVENTION

This invention relates to an improved structure for a variable reluctance electric motor. The motor includes a stator having a plurality of radially inwardly extending poles which extend throughout the longitudinal length thereof. Each of the stator poles is divided into a plurality of longitudinal sections. The cross sectional shapes of the first stator pole sections are different from the cross sectional shapes of the second stator pole sections. A rotor is co-axially supported within the stator for relative rotational movement. A plurality of radially outwardly extending poles are provided on the outer surface of the rotor and extend throughout the longitudinal length thereof. Each of the rotor poles is divided into a plurality of longitudinal sections. The cross sectional shapes of the first rotor pole sections are different from the cross sectional shapes of the second rotor pole sections. The first rotor poles are longitudinally aligned with the first stator poles so as to interact therewith when electrical current is supplied to windings provided on the stator poles. Similarly, the second rotor poles are longitudinally aligned with the second stator poles so as to interact therewith when electrical current is supplied to windings provided on the stator poles. The magnitude of the total torque generated by the motor as a whole is equal to the sum of the magnitudes of the individual torques generated by (1) the interaction of the first rotor poles with the first stator poles and (2) the interaction of the second rotor poles with the second stator poles.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a schematic sectional elevational view taken along line 2—2 of FIG. 1 illustrating the first section of stator and rotor poles.

FIG. 3 is a schematic sectional elevational view taken along line 3—3 of FIG. 1 illustrating the second section of stator and rotor poles.

DETAILED DESCRIPTION OF THE PREFERRED EMBODIMENT

Figure 1:
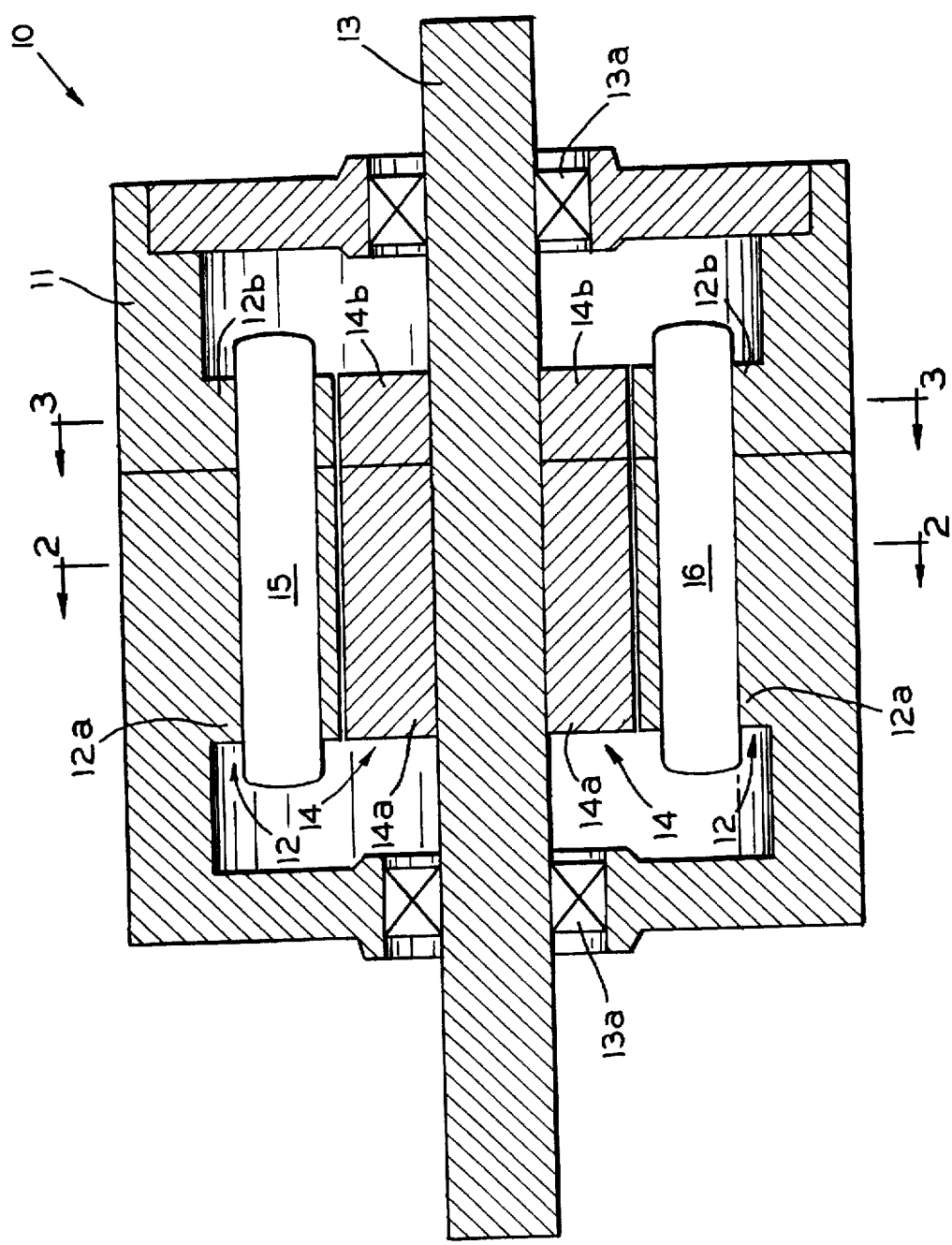
FIG. 1 is a schematic sectional elevational view of a variable reluctance motor having first and second sections of stator and rotor poles in accordance with this invention.

Referring now to the drawings, there is illustrated in FIG. 1 a variable reluctance motor, indicated generally at 10, in accordance with this invention. The motor 10 includes a stator 11 which is generally hollow and cylindrical in shape. A plurality of radially inwardly extending poles, indicated generally at 12, are provided on the inner surface of the stator 11 and extend throughout the longitudinal length thereof. Each of the stator poles 12 is divided into two longitudinal sections, a first stator pole section 12a and a second stator pole section 12b. The purpose for dividing each of the stator poles 12 into the first and second stator pole sections 12a and 12b, respectively, will be explained below.

The stator 11 and the stator poles 12 are formed from a magnetically permeable material, such as iron. The structure of the stator poles 12 will be described in detail below. However, generally speaking, the stator poles 12 are preferably provided in opposed pairs and are equidistantly spaced apart from one another about the inner circumference of the stator 11. For example, six stator poles 12 (such as shown at A1 and A2, B1 and B2, and C1 and C2 in FIGS. 2 and 3) may be provided on the stator 11. However, a greater or lesser number of stator poles 12 may be provided. As will be explained below, each of the stator pole pairs represents one phase for energizing the variable reluctance motor 10 for operation.

A cylindrical rotor 13 is co-axially supported within the stator 11 by a pair of bearings 13a for relative rotational movement. A plurality of radially outwardly extending poles, indicated generally at 14, are provided on the outer surface of the rotor 13 and extend throughout the longitudinal length thereof. Each of the rotor poles 14 is divided into two longitudinal sections, a first rotor pole section 14a and a second rotor pole section 14b. The purpose for dividing each of the rotor poles 14 into the first and second rotor pole sections 14a and 14b, respectively, will be explained below.

As with the stator 11 and the stator poles 12, the rotor 13 and the rotor poles 14 are formed from a magnetically permeable material, such as iron. The structure of the rotor poles 14 will be described in detail below. However, generally speaking, the rotor poles 14 are preferably provided in opposed pairs and are equidistantly spaced apart from one another about the outer circumference of the rotor. For example eight rotor poles 14 (such as shown at W1 and W2, X1 and X2, Y1 and Y2, and Z1 and Z2 in FIGS. 2 and 3) may be provided on the rotor 13. However, a greater or lesser number of rotor poles 14 may be provided. Usually, the number of rotor poles 14 is different from the number of stator poles 12.

An electrical conductor is wound about each of the stator poles 12. As schematically shown in FIGS. 2 and 3, a first pair of windings 15 and 16 is provided on the opposed stator poles A1 and A2, respectively. Second and third pairs of windings (not shown) are similarly provided on the other stator pole pairs B1 and B2, and C1 and C2. The windings 15 and 16 are connected to an electrical current pulse generating circuit (not shown), either in series (as illustrated) or in parallel. The current pulse generating circuit is conventional in the art and is adapted to selectively generate pulses of electrical current through the windings 15 and 16. Similar current pulse generating circuits (not shown) are provided for the other pairs of windings on the stator pole pairs B1 and B2, and C1 and C2.

The timing, magnitude, and polarity of the electrical current pulses generated by the current pulse generating circuits is determined by the rotational position of the rotor 13 relative to the stator 11. To accomplish this, a conventional sensor (not shown) is provided which generates a signal which is representative of such relative rotational position. The current pulse generating circuits are responsive to this rotor position signal for generating the current pulses to the various pairs of windings 15 and 16 of the motor 10 in a predetermined manner described below. As a result, the rotor 13 is rotatably driven relative to the stator 11. Alternatively, the rotor position sensor may be omitted, and the current pulse generating circuits may be activated by a conventional phase sequencer (not shown) which operates independently of the rotational position of the rotor 13.

When electrical current is supplied to the windings 15 and 16 by the current pulse generating circuit, both the stator 11 and the rotor 13 become magnetized. The windings 15 and 16 are oppositely wound such that stator pole A1 (upon which the winding 15 is disposed) is energized to become a magnetic north pole, while the stator pole A2 (upon which the winding 16 is disposed) is energized become a magnetic south pole. As a result, a magnetic circuit is created between these opposed stator poles A1 and A2. Consequently, magnetic flux (lines of force) are created between the north stator pole A1 and the south stator pole A2. The magnetic flux passes from the north stator pole A1 through the nearest rotor pole W1, through the body of the rotor 13, and from the opposed rotor pole W2 to the south stator pole A2. The magnetic circuit between the north and south stator poles A1 and A2 is completed through the outer annular portion of the stator 11.

The resistance to the passage of magnetic flux from the north stator pole A1 to the nearest rotor pole W1 (and similarly from the south stator pole A2 to the nearest rotor pole W2) is referred to as reluctance, as discussed above. The magnitude of this reluctance changes with the rotational position of the rotor poles 14 relative to the stator poles 12. Reluctance is at a minimum when the rotor poles 14 are radially aligned with the stator poles 12, as with A1, W1 and A2, W2 in FIGS. 2 and 3. Consequently, the generation of the magnetic circuit described above produces a torque which tends to align the opposed rotor poles W1 and W2 with the energized opposed stator poles A1 and A2, as shown in FIGS. 2 and 3.

To effect rotation of the rotor 13 relative to the stator 11, the first pair of windings 15 and 16 on the stator poles A1 and A2 is turned off, and the second pair of windings on the stator poles B1 and B2 is turned on. As a result, B1 is energized to become a magnetic north pole, and B2 is energized to become a magnetic south pole. Such energization attracts the nearest rotor poles X1 and X2 to become aligned with the energized stator poles B1 and B2. Consequently, the rotor 13 is rotated relative to the stator 11. To continue such rotation of the rotor 13, the stator poles B1 and B2 are de-energized, and the stator poles C1 and C2 are energized. Thus, the rotor poles Y1 and Y2 are attracted to the stator poles C1 and C2. By sequentially energizing the stator poles 12 in this manner, the rotor poles 14 are sequentially attracted thereto. As a result, the rotor 13 rotates relative to the stator 11 in a direction (clockwise in the illustrated embodiment) which is the same as the direction (clockwise in the illustrated embodiment) in which the stator pole pairs A1 and A2, B1 and B2, and C1 and C2 are energized.

In the illustrated embodiment, the stator 11 is provided with six stator poles 12, while the rotor 13 is provided with eight rotor poles 14. From the above discussion, it can be seen that each time one of the stator pole pairs A1 and A2, B1 and B2, and C1 and C2 is energized, the rotor 13 will be rotated fifteen degrees relative to the stator 11. Thus, the stator pole pairs A1 and A2, B1 and B2, and C1 and C2 must be energized in sequence eight times in order to rotate the rotor 13 throughout one complete revolution. Because the rotational speed of the rotor 13 is directly related to the frequency of the current pulses supplied to the stator poles 12, the motor 10 operates as a synchronous motor. By varying the number of stator poles 12 and rotor poles 14, the rotational speed of the rotor 12 can be varied with respect to the frequency of the current pulses supplied to the stator 11.

As discussed above, each of the stator poles 12 is divided into a first stator pole section 12a and a second stator pole section 12b. The cross sectional shapes of the first and second stator pole sections 12a and 12b, respectively, are illustrated in FIGS. 2 and 3. As shown in FIG. 2, the first stator pole sections 12a have body portions which are generally rectangular in cross sectional shape. However, the radially innermost ends of the first stator pole sections 12a taper slightly inwardly in the circumferential direction to a relatively wide rectangular tip. As shown in FIG. 3, the second stator pole sections 12b also have body portions which are generally rectangular in cross sectional shape. However, the radially innermost ends of the second stator pole sections 12b taper greatly inwardly in the circumferential direction to a relatively narrow rectangular tip. Thus, it can be seen that the cross sectional shapes of the first stator pole sections 12a are different from the cross sectional shapes of the second stator pole sections 12b.

Similarly, each of the rotor poles 14 is divided into a first rotor pole section 14a and a second rotor pole section 14b. The cross sectional shapes of the first and second rotor pole sections 14a and 14b, respectively, are also illustrated in FIGS. 2 and 3. As shown in FIG. 2, the first rotor pole sections 14a have body portions which are generally rectangular in cross sectional shape. As shown in FIG. 3, the second rotor pole sections 14b also have body portions which are generally rectangular in cross sectional shape. However, the radially innermost ends of the second rotor pole sections 14b taper greatly inwardly in the circumferential direction to a relatively narrow rectangular tip. Thus, it can be seen that the cross sectional shapes of the first rotor pole sections 14a are different from the cross sectional shapes of the second rotor pole sections 14b.

As previously described, when electrical current is supplied to the windings 15 and 16 by the current pulse generating circuit, both the stator 11 and the rotor 13 become magnetized. The consequent generation of the magnetic circuit produces a torque which tends to align the opposed rotor poles 14 with the energized opposed stator poles 12. The cross sectional shapes of the stator poles 12 and the rotor poles 14 have an effect upon the magnitude of the resultant generated torque.

The first rotor poles 14a are longitudinally aligned with the first stator poles 12a so as to interact therewith when electrical current is supplied to the windings 15 and 16. A representative graph showing the magnitude of the torque generated by the interaction of the first rotor poles 14a with the first stator poles 12a is illustrated at 20 in FIG. 4. As shown therein, the magnitude of this torque varies as a function of the rotational position of the rotor 13 relative to the stator 11.

Similarly, the second rotor poles 14b are longitudinally aligned with the second stator poles 12b so as to interact therewith when electrical current is supplied to the windings 15 and 16. A representative graph showing the magnitude of the torque generated by the interaction of the second rotor poles 14b with the second stator poles 12b is illustrated at 21 in FIG. 4. As shown therein, the magnitude of this torque also varies as a function of the rotational position of the rotor 13 relative to the stator 11.

Figure 4:
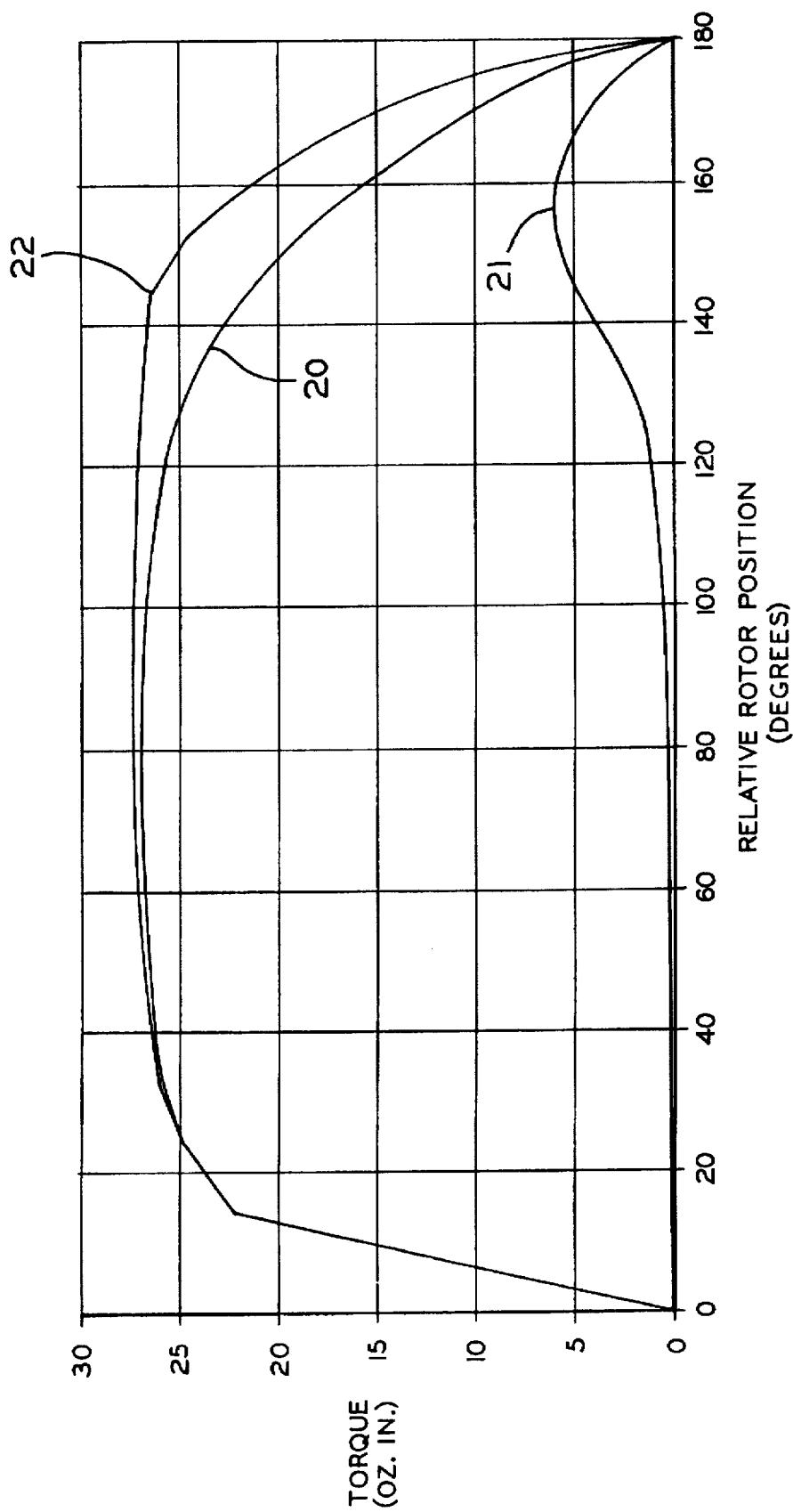
FIG. 4 is a representative graph illustrating the individual magnitudes of the output torques generated by the interactions of the first and second sections of stator and rotor poles, as well as the total output torque generated by the variable reluctance motor as a whole.

The magnitude of the total torque generated by the motor 10 as a whole is equal to the sum of the magnitudes of the individual torques generated by (1) the interaction of the first rotor poles 14a with the first stator poles 12a (illustrated at 20 in FIG. 4) and (2) the interaction of the second rotor poles 14b with the second stator poles 12b (illustrated at 21 in FIG. 4). A representative graph showing the magnitude of the total torque generated by the motor 10 as a whole is illustrated at 22 in FIG. 4. As shown therein, the total torque characteristic 22 more closely approximates the ideal constant value throughout the entire extent of each revolution of the rotor relative to the stator than either of the individual torque characteristics 20 and 21. Thus, the operation of the motor 10 as a whole is improved.

It should be noted that the specific cross sectional shapes or other geometries of the various pole sections 12a, 12b, 14a, and 14b are not critical to this invention. On the contrary, the various pole sections 12a, 12b, 14a, and 14b may be formed having any desired cross sectional shapes or other geometries which achieve a desired total torque characteristic 22. What is important in this invention is that the total torque characteristic 22 be derived as a summation of the differing individual torque characteristics 20 and 21 achieved by (1) the interaction of the first rotor poles 14a with the first stator poles 12a and (2) the interaction of the second rotor poles 14b with the second stator poles 12b. Thus, the cross sectional shapes of the first stator pole sections 12a can be different from the cross sectional shapes of the second stator pole sections 12b, the cross sectional shapes of the first rotor pole sections 14a can be different from the cross sectional shapes of the second rotor pole sections 14b, or both can be different as illustrated. Also, the number of pole sections provided on either or both of the stator 11 and the rotor 13 can be greater than the two poles sections which are illustrated.

The stator 11 and the rotor 13 can be manufactured in any desired manner. For example, the stator 11 and its associated poles 12 can be formed by initially stamping a plurality of laminations from a relatively thin sheet of such magnetically permeable material. Each of these laminations has a cross sectional shape which corresponds to the cross sectional shape of the stator 11 and the stator poles 12 illustrated in FIGS. 2 and 3. The laminations are then stacked on a fixture so as to be aligned with one another. Adhesive (not shown) is applied between adjacent laminations to prevent them from rotating relative to one another because of torsional forces encountered during use. The adhesive may be applied by means of a conventional vacuum process after all of the laminations have been stacked upon the fixture. Such vacuum impregnation of adhesive is also effective to reduce noise. Alternatively, the adhesive may be individually applied as the laminations are stacked upon one another on the fixture.

In either instance, the adhesive maintains the stack of laminations in alignment so that a plurality of longitudinally extending welds (not shown) can be made along the outer surface of the stack of laminations. Such welding can be performed by known electron beam techniques so as to prevent axial and torsional separation of the laminations. Alternatively, the stator 11 can be secured together by rivets, half blanking, or other conventional means. The stator 11 is preferably constructed in this laminated manner to minimize the generation of eddy currents therein, which can reduce the strength of the electromagnetic field generated thereby. The rotor 13 and its associated poles 14 can be formed in a similar manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A variable reluctance electric motor comprising:

a stator having a plurality of radially inwardly extending stator poles, each of said stator poles being formed from a magnetically permeable material and divided into a first stator pole section and a second stator pole section having respective cross sectional shapes, said cross sectional shapes of said first stator pole sections being different from said cross sectional shapes of said second stator pole sections;

a rotor supported within said stator for relative rotational movement and having a plurality of radially outwardly extending rotor poles, each of said rotor poles being formed from a magnetically permeable material and divided into a first rotor pole section and a second rotor pole section having respective cross sectional shapes, said cross sectional shapes of said first rotor pole sections being different from said cross sectional shapes of said second rotor pole sections, a magnetic reluctance being defined between said rotor poles and said stator poles, said magnetic reluctance varying between a minimum reluctance when said rotor poles are radially aligned with said stator poles and a maximum reluctance when said rotor poles are not radially aligned with said stator poles; and a winding of an electrical conductor disposed about each of said stator poles, said windings adapted to be connected to a control circuit for selectively passing electrical current therethrough so as to generate a magnetic circuit, said magnetic circuit exerting a force on said rotor poles urging them to move toward said position of minimum magnetic reluctance so as to cause said rotor assembly to rotate relative to said stator.

2. The variable reluctance electric motor defined in claim 1 wherein said stator is formed from iron.

3. The variable reluctance electric motor defined in claim 1 wherein said rotor is formed from iron.

4. The variable reluctance electric motor defined in claim 1 wherein said stator is generally hollow and cylindrical in shape, and said rotor is generally cylindrical in shape.

5. The variable reluctance electric motor defined in claim 1 wherein said stator poles are provided on said stator in opposed pairs and are equidistantly spaced apart from one another about the inner circumference of said stator.

6. The variable reluctance electric motor defined in claim 1 wherein said rotor poles are provided in opposed pairs and are equidistantly spaced apart from one another about the outer circumference of said rotor.

7. The variable reluctance electric motor defined in claim 1 wherein said stator poles are provided on said stator in opposed pairs and are equidistantly spaced apart from one another about the inner circumference of said stator, and wherein said rotor poles are provided in opposed pairs and are equidistantly spaced apart from one another about the outer circumference of said rotor.

8. The variable reluctance electric motor defined in claim 1 wherein a different number of said stator poles is provided on said stator than said rotor poles provided on said rotor.

9. The variable reluctance electric motor defined in claim 8 wherein said stator is provided with six stator poles and said rotor is provided with eight rotor poles.

10. The variable reluctance electric motor defined in claim 1 wherein said first stator pole section defines a body portion which is generally rectangular in cross sectional shape, a radially innermost end of said first stator pole section tapering slightly inwardly in the circumferential direction to a relatively wide rectangular tip.

11. The variable reluctance electric motor defined in claim 1 wherein said first rotor pole section defines a body portion which is generally rectangular in cross sectional shape.

12. The variable reluctance electric motor defined in claim 1 wherein said second stator pole section defines a body portion which is generally rectangular in cross sectional shape, a radially innermost end of said second stator pole section tapering greatly inwardly in the circumferential direction to a relatively narrow rectangular tip.

13. The variable reluctance electric motor defined in claim 1 wherein said second rotor pole section defines a body portion which is generally rectangular in cross sectional shape, a radially outermost end of said second rotor pole section tapering greatly inwardly in the circumferential direction to a relatively narrow rectangular tip.

14. The variable reluctance electric motor defined in claim 1 wherein said first stator pole section defines a body portion which is generally rectangular in cross sectional shape, a radially innermost end of said first stator pole section tapering slightly inwardly in the circumferential direction to a relatively wide rectangular tip, said first rotor pole section defines a body portion which is generally rectangular in cross sectional shape, said second stator pole section defines a body portion which is generally rectangular in cross sectional shape, a radially innermost end of said second stator pole section tapering greatly inwardly in the circumferential direction to a relatively narrow rectangular tip, and said second rotor pole section defines a body portion which is generally rectangular in cross sectional shape, a radially outermost end of said second rotor pole section tapering greatly inwardly in the circumferential direction to a relatively narrow rectangular tip.

* * * * *